United States Patent [19]

Huffman

[11] Patent Number: 4,602,925
[45] Date of Patent: Jul. 29, 1986

[54] MOISTURE SEPARATOR

[75] Inventor: Kenneth L. Huffman, Monroeville Boro, Pa.

[73] Assignee: Westinghouse Electric Corp., Pittsburgh, Pa.

[21] Appl. No.: 686,798

[22] Filed: Dec. 27, 1984

[51] Int. Cl.⁴ ............................................. B01D 45/12
[52] U.S. Cl. ..................................... 55/457; 55/435; 55/458; 122/488; 122/492
[58] Field of Search ............... 55/435, 452, 456, 457, 55/458; 122/488, 492

[56] References Cited

U.S. PATENT DOCUMENTS

| | | |
|---|---|---|
| 557,109 | 3/1896 | Cochrane . |
| 680,717 | 8/1901 | Labadie . |
| 714,381 | 11/1902 | Koelkebeck . |
| 1,013,677 | 2/1912 | Mitchell . |
| 1,703,917 | 3/1929 | Alexander . |
| 1,896,896 | 2/1933 | Hawley . |
| 2,425,588 | 8/1947 | Alexander . |
| 2,594,490 | 4/1952 | Patterson .......................... 122/492 X |
| 2,659,450 | 11/1953 | Baird ................................... 55/456 X |
| 2,961,064 | 11/1960 | Fisher . |
| 3,016,979 | 1/1962 | Schmid ............................. 55/456 X |
| 3,481,120 | 12/1969 | Lustenader . |
| 3,710,556 | 1/1973 | Barratt et al. ................... 122/488 X |
| 3,729,904 | 5/1973 | York . |
| 3,788,282 | 1/1974 | Modrak et al. . |
| 3,961,923 | 6/1976 | Rouhani . |
| 4,162,150 | 7/1979 | Carson . |
| 4,238,210 | 12/1980 | Regehr et al. . |
| 4,349,360 | 9/1982 | Schuurmans et al. . |

Primary Examiner—Charles Hart
Attorney, Agent, or Firm—L. A. DePaul

[57] ABSTRACT

Steam turbine apparatus is disclosed as comprising first and second turbine sections having respectively an outlet opening and an inlet opening. The first or high pressure turbine section has a plenum wall adjacent its exhaust opening that collects water thereon. A crossover structure is disposed between the outlet opening and the inlet opening for transmitting a steam/water mixture to the second or low pressure turbine section. A hollow member having first and second openings at its respective ends,' is associated with the first turbine section such that the first opening is sealed with respect to the outlet opening. The hollow member extends into the first turbine section and its second opening is dimensioned to shadow the outlet opening so that the hollow member captures and discharges the water contacting the adjacent plenum wall and to inhibit the steam/water mixture directed through the outlet opening from stripping and conveying the contacting water to the crossover structure.

16 Claims, 4 Drawing Figures

MOISTURE SEPARATOR

BACKGROUND OF THE INVENTION

1. Field of the Invention

This invention relates to moisture separators for use in turbine apparatus and, more particularly, to moisture separators for extracting moisture from the steam/water mixture exiting a high pressure steam turbine to obtain an increased level of steam dryness before it enters a moisture separator reheater.

2. Description of the Prior Art

FIG. 1 illustrates a large steam turbine apparatus 10 such as commonly used in large central station power generation facilities and includes a first, high pressure turbine section 12 and a second, low pressure turbine section 14. A steam/moisture mixture is successively expanded through the high pressure turbine section 12 and the low pressure turbine section 14 to rotate a turbine rotor 15, which is coupled to the rotator of an electrical generator 11. Steam/moisture transmission between the high pressure turbine section 12 and the low pressure turbine section 14 is provided by a crossover structure 20 arranged therebetween. The steam/moisture mixture flows through the turbine apparatus 10, entering an inlet opening 17, expanding through the high pressure turbine section 12 to exhaust portions 16, leaving through exit nozzle or outlet openings 24, passing through one or more moisture separator reheaters 13 (only one illustrated) and the crossover structure 20, entering inlet opening 18 of the low pressure turbine section 14, and expanding through the low pressure turbine section 14.

The crossover structure 20 includes the moisture separator reheater 13, which reduces the moisture content of the steam/moisture mixture exiting the high pressure turbine section 12 to thereby improve turbine efficiency, to reduce the low pressure turbine exhaust moisture, and to reduce maintenance on the low pressure turbine section 14. The moisture separator reheater 13 includes a single pressure vessel and a moisture separator therein for receiving the steam/moisture mixture and for removing and draining moisture therefrom. The steam rises above the moisture separator and passes over two tube bundles 21, where it is reheated by steam from the main steam header and from the high pressure turbine section 12. Typically, the moisture separator may extract approximately 10% of the steam/moisture mixture as moisture, the remaining 90% of the mixture passing to the reheater in the form of the tube bundles 21. The outlet conduit 22 from the moisture separator reheater 13 is provided with two automatic valves 19a and 19b, which close on a turbine trip and control overspeed of the steam turbine 10, which would result from the expansion of entrained steam in the high pressure turbine section 12 and reheaters through the low pressure turbine 14. A hot reheated steam/moisture mixture is conveyed to the low pressure turbine 14. It is understood that more than one low pressure turbine 14 may be included within the steam turbine apparatus 10 depending on the required electrical output.

The outlet conduit 22 is typically identified as being part of the crossover conduit structure 20 disposed between the high and low pressure turbine sections 12 and 14. The steam/moisture mixture passing through such crossover conduit structure 20 has a thermodynamic state, which falls in the so called "wet region" where some moisture has condensed. Such condensation has the propensity for collecting on the inside of the crossover conduit structure 20 and on the outlet opening 24 of the high pressure turbine section 12. Droplets of the collected moisture are intermittently stripped from the interior surface of the crossover conduit structure 20 by the high velocity of steam/moisture mixture passing therethrough. The separated droplets are accelerated by the high velocity mixture, striking many components of the low pressure turbine section 14 and, thus, causing erosion of its turbine rotor and blades. Such erosion can adversely affect the performance and reliability of the low pressure section 14, as well as the crossover conduit structure 20. Further, the conduit leading from the outlet openings 24 to the moisture separator reheater 13 is typically made of carbon steel piping and may be subject to substantial erosion. This conduit, the moisture separator reheater 13 and the outlet conduit 22 had been particularly subject to erosion, where the steam turbine apparatus 10 has significant operating service typically five years or more.

The prior art has many examples of efficient moisture separators, which are modular and could be coupled into the steam turbine apparatus 10, as shown in FIG. 1. In order to connect such moisture separators, a specially designed conduit would be required to interconnect the high pressure turbine 12 and the contemplated modular moisture separator and, in turn, the modular separator and the moisture separator reheater 13. In addition to expense, such interconnected moisture separators would decrease the velocity of the steam passing therethrough and impart an undue pressure drop to the steam as it passes to the low pressure turbine section 14.

SUMMARY OF THE INVENTION

It is therefore an object of this invention to provide a new and improved moisture separating apparatus for significantly reducing the moisture content of the steam/moisture mixture flowing from a high pressure turbine section through a crossover structure to a low pressure turbine section and, thereby, reduce the erosion damage thereto.

It is a further object of this invention to provide a moisture separator that may be readily installed on a high pressure turbine section without the use of further interconnecting or crossover structure.

It is a more particular object of this invention to provide a moisture separator associated with an outlet opening of a high pressure turbine section for removing the relatively large droplets of water, e.g., those having a diameter of 50 microns or greater, from the steam/moisture mixture flowing from the outlet openings.

In accordance with these and other objects of this invention, there is provided steam turbine apparatus comprising first and second turbine sections having respectively an outlet opening and an inlet opening. The first or high pressure turbine section has a plenum wall adjacent its outlet opening that collects water thereon. A crossover structure is disposed between the outlet opening and the inlet opening for transmitting a steam/water mixture to the second or low pressure turbine section. A hollow member having first and second openings at its respective ends, is associated with the first turbine section such that the first opening is sealed with respect to the outlet opening. The hollow member extends into the first turbine section and its second opening is dimensioned to shadow the outlet opening so that the hollow member captures and discharges the water contacting the adjacent plenum wall and to inhibit the steam/water mixture directed through the outlet opening from stripping and conveying the contacting water to the crossover structure.

In a further aspect of this invention, the hollow member has an outer peripheral surface spaced from the plenum wall to form an annular space therebetween for conveying the collected water, and discharge openings disposed through the plenum wall in communication with the annular space for discharging the collected water from the first turbine section.

In a still further aspect of this invention, a set of vanes is disposed within the hollow member, each vane of the set extending from an axis of the hollow member to its inner peripheral surface. Perforations are disposed in the vane surfaces for extracting the water collected thereon, and ports are disposed in communication with these perforations for receiving and discharging the collected water therefrom.

In a further aspect of this invention, the hollow member has an outer peripheral surface spaced from the plenum wall to form an annular space therebetween and a plurality openings is disposed therein to direct the water to the annular space.

BRIEF DESCRIPTION OF THE DRAWINGS

The invention will be more fully understood from the following detailed description of the preferred embodiment, taken in connection with the accompanied drawings, in which.

DESCRIPTION OF THE PREFERRED EMBODIMENT

In accordance with this invention, erosion within the crossover structure 20 is highly dependent upon the thermodynamic state of the steam/moisture mixture flowing therethrough. In particular, the rate and extent of erosion corresponds with the size of the droplets in the steam/moisture mixture. Further, a minority of the total moisture content in the steam/moisture mixture causes a major part of the total erosion damage. The moisture content within the crossover structure 20 has been found to be in the order of 10% and the majority of this moisture exists as relatively small droplets having a diameter in the order of 10 microns. A mixture of such small droplets is formed by the thermodynamic expansion through the high pressure turbine section 12. The bulk of the steam/moisture mixture neither contacts the blade surfaces nor end wall boundaries of the high pressure turbine section 12 thus permitting the thermodynamic expansion of the mixture of relatively small droplets. On the other hand, a small percentage of the steam/moisture mixture contacts the interior end walls and blade surfaces of the high pressure turbine section 12, where agglomeration occurs. If the agglomeration is not removed, the high velocity steam/moisture mixture will pick up this moisture in the form of relatively large droplets in the order of 100 microns diameter. It has been found that these larger size droplets cause the primary moisture damage to the moisture separator reheater 13 and the crossover structure 20.

Figure 1:
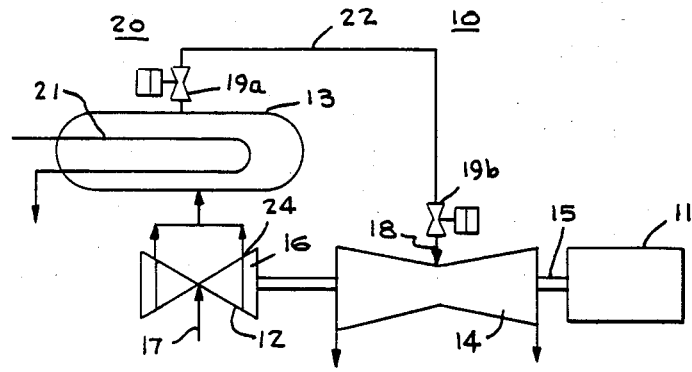
FIG. 1 is a schematic representation of steam turbine apparatus including a high pressure and a low pressure turbine section and incorporating the subject invention.
Figure 2:
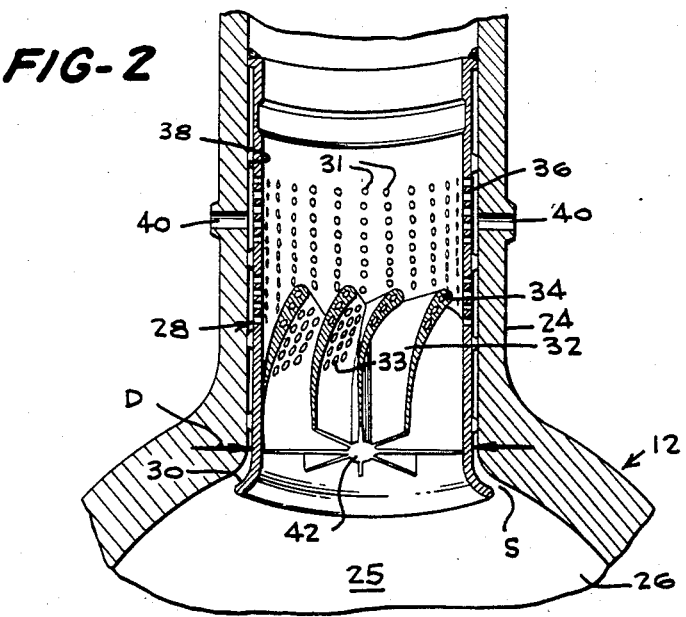
FIG. 2 is a broken away, sectioned view of a moisture separator incorporated in accordance with the teachings of this invention with the outlet opening of the high pressure turbine section, as shown in FIG. 1.

Referring now to FIG. 2, there is shown a moisture separator associated with the outlet opening 24 of the high pressure turbine section 12 in accordance with the teachings of this invention. The high pressure turbine section 12 comprises a plenum 25 for containing the steam/moisture mixture. This mixture is forced from the plenum 25, through the outlet opening 24 and to the moisture separator reheater 13, as shown in FIG. 1. As mentioned above, moisture in the steam/moisture mixture collects on a plenum wall 26. If this collected moisture were not removed, the high velocity mixture would pick it up in the form of relatively large droplets and carry them to the moisture separator reheater 13 and the crossover structure 20 causing significant erosion damage. In accordance with the teachings of this invention, there is included a three stage, moisture separator that collects a significant proportion of the water agglomeration on the plenum wall 26, before it may be carried to the moisture separator reheater 13 and the crossover structure 20 and cause significant erosion damage thereto.

The first stage of the moisture separator in accordance with the teachings of this invention traps and removes the water that has collected on the plenum wall 26 and accomplishes this separation with a plenum catch lip 30 as shown in FIG. 2. In the illustrative embodiment of FIG. 2, the catch lip 30 is integrally associated with an erosion liner 28. The catch lip 30 has a diameter across its leading end, greater than that of the outlet opening 24, whereby the flow pattern of the steam/moisture mixture directs the collected moisture into an annular space 38 formed between the erosion liner 28 and an inner peripheral surface of the outlet opening 24. Discharge bosses 40 are disposed within the outlet opening 24, whereby the collected water may be drained off. It can be seen in FIG. 2 that the catch lip 30 is so configured to prevent the moisture collected on the plenum wall 26 from being picked up by the steam/moisture mixture and carried through the outlet opening 24 to the moisture separator reheater 13 and the crossover structure 20.

The dimensions and configuration of the catch lip 30 are set by two limiting conditions. As explained above, the water contacts the plenum wall 26 forming a "concentrated liquid" layer over that area adjacent the outlet opening 24. The spacing between the catch lip 30 and the plenum wall 26 is set sufficiently great so that the flow of the steam/moisture mixture directs the "concentrated liquid" layer through the gap or spacing marked by the letter S and into the annular space 38. The amount of water per unit time, m, so trapped can be approximated by the following expression:

$$m = (1-X)\rho V\pi DS,$$

where V is the velocity of the steam/moisture mixture and is indicative of the "concentrated liquid" layer velocity, S is indicative of the spacing, D is indicative of the diameter of the outlet opening as shown in FIG. 2, X is the liquid layer quality of the steam/moisture mixture in terms of the relative mass of the steam moisture therein, and $\rho$ is the mass density of the liquid.

On the other hand if the gap S is set too large, the catch lip 30 will interfere with the flow of the steam/moisture mixture, causing a turbulence in that flow whereby the amount of water picked up from the "concentrated liquid" layer on the plenum wall 26 is significantly increased. The gap S is defined as a function of the cross-sectional area of the outlet opening 24, the fluid properties and the velocity of the flow through the outlet opening. It is contemplated that the area of this annular gap should not exceed 10% of the entire cross-sectional area of the outlet opening 24.

Further, the configuration of the catch lip 30 is made to conform to that of the boundary region between the plenum wall 26 and the outlet opening 24, whereby the degree of turbulence may be minimized.

The second stage of the moisture separator of this invention comprises an arrangement of a plurality of curved vanes 32, as shown in FIG. 2. In particular, the vanes 32 are disposed to extend radially from an axis of the outlet opening 24. Each vane 32 extends from a center post 42 disposed to coincide with the axis of the outlet opening 24 and extends radially outward therefrom to the inner peripheral surface of the erosion liner 28. The arrangement of vanes 32 offers a low resistance to the steam/moisture mixture flowing through the outlet opening 24 that sequentially turns the mixture causing a pressure gradient therein. As a result, the liquid in the mixture is forced against one of the vanes 32 due to the greater momentum of the liquid phase than the vapor phase. The liquid forced against the vanes 32 is extracted through spatially variable area perforations 33. In other words, those perforations 33 disposed at the bottom of the vanes 32 as would first meet the flow of the steam/water mixture through the outlet opening 24, are dimensioned different, typically larger, than those perforations 33 disposed downstream of this flow. By so dimensioning the perforations 33, the capability of discharging water is optimized. In turn, the perforations 33 are connected to a plurality of extraction ports 34 that direct the collected liquid through the erosion liner 28 and the annular space 38 to be discharged through the bosses 40.

Not all of the liquid phase in the mixture passing through the outlet opening 24 is collected by the perforations 33. Rather, the final stage of moisture removal is effected by the erosion liner 28. As shown in FIG. 2, the erosion liner 28 is essentially cylindrical in configuration and has a plurality of openings 31 disposed in rows aligned substantially parallel with the axis of the exit nozzle 24 and spaced from each other about the periphery of the erosion liner 28. The arrangement and configuration of vanes 32 direct the steam/moisture mixture against the inner peripheral surface of the erosion liner 28 due to the relatively greater momentum of the liquid phase as compared to the steam phase of the mixture. The inner peripheral surface of the erosion liner 28 collects the moisture and the openings 31 direct the moisture through the annular space 38 to be discharged by the bosses 40.

Figure 3:
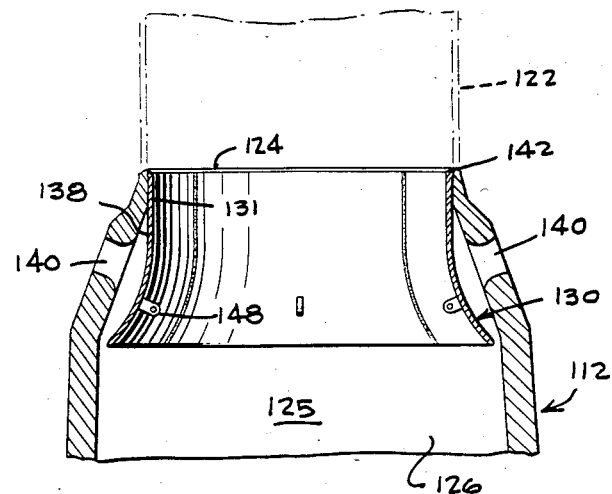
FIGS. 3 and 4 are respectively a sectioned view and a plan view of a moisture separator in accordance with a further embodiment of this invention.
Figure 4:
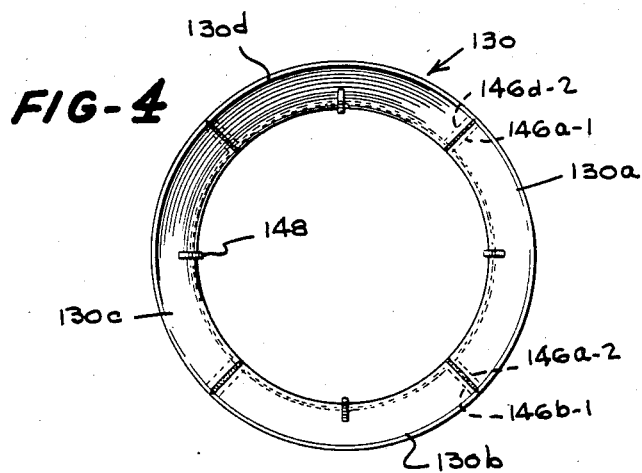

Referring now to FIGS. 3 and 4, there is shown a further embodiment of this invention, wherein like elements are identified by similar numbers except in the 100 series. A catch lip 130 is disposed adjacent the outlet opening 124 of the high pressure turbine section 112. As particularly shown in FIG. 3, the catch lip 130 is configured as a cylinder and curves outwardly toward the inner peripheral surface of the plenum wall 126. A plurality of discharge bosses 140 is disposed within the plenum wall 126 to discharge the collected liquid. The outlet conduit 122 as shown in dotted line is connected directly to the outlet opening 124. The catch lip 130 is made of a corrosion resistant material such as austenitic stainless steel or alloy 600. In a preferred embodiment, alloy 600 is selected in that its expansion coefficient is closer to the low alloy steel of which the plenum 125 is made. As shown in FIG. 3, the diameter of the catch lip 130 narrows down to an exhaust snout 131 at its discharge end.

Because of the different thermal characteristics of the material of which the catch lip 130 and the plenum 126 are made, special attention needs to be given to the manner in which the catch lip 130 is welded to the plenum 125. The weld joint therebetween is designed to insure the weld section has greater strength than the local wall region of the catch lip 130. As shown in FIG. 3, a weld joint 142 is made between the exhaust snout and the extremity of the plenum 125. If the weld 142 cracks, the collected water within the annular space 138 between the catch lip 130 and the plenum wall 126 may escape into the main stream and create large droplets, thus increasing the potential erosion in the crossover structure 20 and the moisture separator reheater 13. Thus, care is taken that the weld 142 is carefully made and subsequently inspected to insure its integrity.

As illustrated in FIG. 3, the catch lip 130 has a particular curvature imparting an increased rigidity to the catch lip 130. In addition, the configuration and dimensions are controlled, as explained above, to maximize the amount of water in the "concentrated liquid" layer on the plenum wall 126 that may be trapped by the catch lip 130, while not unduly causing turbulence in the flow of the steam/moisture mixture. It is generally desirable to extend the catch lip 130 as far as reasonably possible into the exterior or the plenum 125. The extent of insertion may be limited by the configuration of the plenum 125. For example as seen in FIG. 3, the catch lip 130 extends a distance in, corresponding to that point at which the plenum 125 begins to narrow down to its outlet opening 124.

To further enhance stiffness, the catch lip 130 has illustratively four longitudinal stiffing ribs. As shown in FIG. 4, the catch lip may be constructed of four sections 130a, b, c and d. Each section of the catch lip 130 has a rib 146 disposed at its end. For example, section 138 includes ribs 146a1, 146a2. In an illustrative embodiment of this invention, adjacent ribs 146, for example 146a2 and 146b1, are V-groove welded to tightly secure adjacent sections together, as well as to provide a strong rib to further enhance the stiffness of the catch lip 130. Such support structures reduce the possibility of flutter of chatter between the catch lip 130 and the plenum 125. In addition, a plurality of lugs 148 may be disposed upon the inner surface of the catch lip 130 to provide means for grasping and positioning each section, while the welds are being made.

The moisture separator of this invention is disposed within the plenum 25 of the high pressure turbine section 12 and, in particular, adjacent its outlet opening 24. As a result, this moisture separator may be installed within an existing steam apparatus 10 with a minimum of redesign and cost, as would be required by inserting a separate, modular separator between the high pressure turbine section 12 and its moisture separator reheater 13. Initial observations indicate that the moisture separator of this invention will significantly reduce the rate of erosion by at least 50% in that part of the crossover structure 20 between the exit nozzle 24 and the moisture separator reheater 13. This reduction in erosion primarily results from the removal of large water drops having their origin in the breakup and entrainment of the water film in the crossover structure 20. Further, the disposition of the catch lip 30 and its erosion liner 28 adjacent the outlet opening 24 avoids the crossover pipe velocity increases and other losses associated with the use of discrete separate moisture separators. As a secondary advantage, the moisture separator of this invention reduces maintenance expenses associated with the existing moisture separator reheaters 13 reducing their need to remove water and reducing their expected erosion. An additional advantage of this invention resides in that the expected reduction in moisture content present in the crossover structure 20 will reduce the pressure drop associated with that flow through the crossover structure 20 thereby providing an improvement in the heat rate. Initial calculations shown that a 1% reduction in pressure loss in that part of the crossover structure 20 between the high pressure turbine section 12 and the moisture separator reheaters 13 will produce an improvement of about 12 BTU/KWH in heat rate.

The principal advantage of the use of this invention resides in the reduced erosion and improved reliability of the crossover structure 20. This is achieved by capturing the large water droplets, i.e., those above 50 microns, that would otherwise be present in the turbine exhaust. These large droplets, about 20% of the total water present, have appreciable drift velocity, contacting the plenum wall 26 and covering it with a film of water. As this film of water thickens, it is partially stripped off the plenum wall 26, forming large droplets that can collide with the crossover structure 20 and eroding its inner walls. The major portion, at least 80%, of the water phase of the steam/moisture mixture is in the form of very small droplets, less than 10 microns. These droplets essentially follow the path of the steam/moisture mixture and do not appreciably contribute to erosion damage.

In considering this invention, it should be remembered that the present disclosure is illustrative only and the scope of the invention should be determined solely by the appended claims.

I claim:

1. Steam turbine apparatus comprising:
   (a) first and second turbine sections having respectively an outlet opening and an inlet opening, said first turbine section having a plenum wall adjacent its outlet opening that collects water thereon;
   (b) a crossover structure disposed between said outlet opening of said first tubular section and said inlet opening of said second tubular section for transmitting a steam/water mixture therebetween;
   (c) a hollow member within said first turbine section and having first and second end openings at its respective ends, said first end opening sealed with respect to said outlet opening of said first turbine, said hollow member having a lip extending into said first turbine section and forming said second end opening, and said second end opening dimensioned to overlie said outlet opening of said first turbine so that said hollow member captures and discharges the water contacting said adjacent plenum wall and to inhibit the steam/water mixture directed through said outlet opening from stripping and conveying the contacting water to said crossover structure; and
   (d) discharge means disposed intermediate said outlet opening of said first turbine section and second end opening of said hollow member for discharging the contacting water from said plenum wall.

2. The steam turbine apparatus as claimed in claim 1, wherein said first opening and said outlet opening have respectively first and second dimensions, said first dimension being greater than said second dimension.

3. The steam turbine apparatus as claimed 2, wherein said hollow member has an outer peripheral surface spaced from said plenum wall to form an annular space therebetween for conveying the collected water, said discharge means disposed through said plenum wall in communication with said annular space for discharging the collected water from said first turbine section.

4. The steam turbine apparatus as claimed in claim 1, wherein there is provided vane means disposed within said hollow member for providing a collecting surface orientated with respect to the flow of the steam/water mixture to receive and collect water therefrom.

5. The steam turbine apparatus as claimed in claim 4, wherein said vane means comprises a set of vanes, each having a collecting surface.

6. The steam turbine apparatus as claimed in claim 5, wherein said outlet opening has an axis, each vane of said set extending from said axis to an inner peripheral surface of said hollow member.

7. The steam turbine apparatus as claimed in claim 6, wherein said collecting surface of each vane has a plurality of perforations therein for collecting the water collected thereon, and port means in communication with said perforations for receiving and discharging the collected water therefrom.

8. The steam turbine apparatus as claimed in claim 7, wherein said hollow member has an outer peripheral surface spaced from said plenum wall to form an annular space therebetween, said port means of each of said vanes extending through said hollow member and being in communication with said annular space, whereby the collected water is discharged therefrom.

9. The steam turbine apparatus as claimed in claim 1, wherein there is included directing means for disposed within said hollow member for directing the flow of the steam/water mixture onto an inner peripheral surface of said hollow member, said hollow member having a plurality of openings therein for discharging the water therethrough.

10. The steam turbine apparatus as claimed in claim 9, wherein said hollow member has an outer peripheral surface spaced from said plenum wall to form an annular space therebetween, said openings in communication with said annular space.

11. The steam turbine apparatus as claimed in claim 10, wherein said outlet opening has an axis and said directing means comprises a plurality of vanes extending radially form said axis to an inner peripheral surface of said hollow member, each of said blades has a directing surface for directing the steam/water mixture flowing through said outlet opening onto said inner peripheral surface of said hollow member.

12. The steam turbine apparatus as claimed in claim 1, wherein said lip is configured and said second opening is dimensioned to form a space between said hollow member and said plenum wall sufficient to capture the water contacting said plenum wall.

13. The steam turbine apparatus as claimed in claim 12, wherein said second opening is dimensioned less than said lip dimension, and the area of the space between said lip and said plenum wall does not exceed, depending on the velocity and the properties of the steam/water mixture, approximatley 10% of the cross sectional area of said outlet opening.

14. The steam turbine apparatus as claimed in claim 12, wherein said space is formed less than said lip dimension, that would establish a turbulence in the flow of the steam/moisture mixture through said outlet opening and would strip said contacting water from said adjacent plenum wall.

15. The steam turbine apparatus as claimed in claim 1, wherein said hollow member is comprised of a plurality of sections adapted to be assembled with each other, whereby each section may be readily inserted through said outlet opening and assembled within said first turbine section.

16. The steam turbine apparatus as claimed in claim 15, wherein each section has a rib disposed at its end adapted to be joined to a rib of an adjacent section.

* * * * *